United States Patent [19]
Tanner

[11] Patent Number: 5,992,805
[45] Date of Patent: Nov. 30, 1999

[54] MEDIA MASTER APPARATUS

[76] Inventor: Jeff Tanner, Suite E, 3129 Swetzer Rd., Loomis, Calif. 95650

[21] Appl. No.: 08/726,044

[22] Filed: Oct. 3, 1996

[51] Int. Cl.⁶ .................................................. F16M 11/00
[52] U.S. Cl. .................... 248/161; 248/125.8; 248/177.1
[58] Field of Search ................................ 248/125.8, 161, 248/170, 171, 188.2, 370, 412, 177.1, 178.1; 381/300, 334; 455/403, 556

[56] References Cited

U.S. PATENT DOCUMENTS

| | | | |
|---|---|---|---|
| D. 325,679 | 4/1992 | O'Mealy et al. | 248/170 |
| 669,480 | 3/1901 | Havell | 248/171 |
| 768,987 | 8/1904 | Graf | 248/171 |
| 1,175,352 | 3/1916 | Hand | 248/161 |
| 2,481,264 | 9/1949 | Tulowiecki | 248/461 |
| 2,642,247 | 6/1953 | Bode | 248/171 |
| 3,355,035 | 11/1967 | Bennett | 248/171 |
| 4,070,546 | 1/1978 | Hirota | 381/300 |
| 4,606,525 | 8/1986 | Lombardi | 248/460 |
| 4,993,061 | 2/1991 | Hsieh | 455/403 |
| 5,037,057 | 8/1991 | Andrews | 248/480 |
| 5,072,910 | 12/1991 | May | 248/412 |
| 5,186,429 | 2/1993 | Linnepe et al. | 248/412 |

*Primary Examiner*—Ramon O. Ramirez
*Assistant Examiner*—Anita M. King
*Attorney, Agent, or Firm*—Michael I. Kroll

[57] ABSTRACT

A media master apparatus (10) comprising an adjustable stand (12) placed upon a floor (14) in a building (16). An electronics communication unit (18) is provided. A facility (20) is for attaching the electronics communication unit (18) to a top end of the adjustable stand (12). A person (22) using an exercise device (24) on the floor (14) adjacent the apparatus (10) can conveniently operate the electronics communication unit (18) from the exercise device (24).

1 Claim, 3 Drawing Sheets

MEDIA MASTER APPARATUS

BACKGROUND OF THE INVENTION

1. Field of the Invention

The instant invention relates generally to electronic audio equipment and upright support structures and more specifically it relates to a media master apparatus.

2. Description of the Prior Art

Numerous electronic audio equipment and upright support structures have been provided in prior art. For example, U.S. Pat. Nos. 669,480 to Havell; 4,070,546 to Hirots; 4,993,061 to Hsieh and 5,072,910 to May all are illustrative of such prior art. While these units may be suitable for the particular purpose to which they address, they would not be as suitable for the purposes of the present invention as heretofore described.

HAVELL, GEORGE

TELESCOPIC STAND

U.S. Pat. No. 669,480

In a telescopic stand having a tripod, and a split socket supported thereby, the combination, with the jointed legs and the bottom tube of the leg-joint having three sheet-metal segments formed each in one piece and comprising hub and wing sections secured concentrically upon the tube with the wing sections parallel and spaced apart to admit the legs.

HIROTA, KASHICHI

PORTABLE STEREO RADIO APPARATUS

U.S. Pat. No. 4,070,546

A portable stereo audio apparatus consists of a pair of speaker cabinets each containing a loudspeaker and a main cabinet containing electric devices such as amplifiers and a radio receiver. The speaker cabinets and the main cabinet are in the form of rectangular boxes. The speaker cabinets have half the width of the main cabinet and are normally set on the main cabinet. The speaker cabinets are hinged at their lower outer edge to each upper outer edge of the main cabinet, so that when the audio apparatus is used as a stereophonic system the speaker cabinets are rotated about the hinges and located at both sides of the main cabinet. The speaker cabinets have the edge diagonally opposite the lower outer edge, i.e., the upper inner edge, so formed as to provide gripping means when the speaker cabinets are rotated about the hinges and located on top of the main cabinet that enable the apparatus to be gripped by one hand and toted about.

HSIEH, SHENG-YU

PORTABLE MINIATURE HIGH FIDELITY STEREO TAPE PLAYER AND CORDLESS RADIO TELEPHONE SYSTEM

U.S. Pat. No. 4,993,061

A portable high fidelity tape player and cordless radio telephone system includes a base unit, a handset unit and a stereo unit, in which the stereo unit includes a carrier filter, a carrier receiver, a pilot tone filter, a pilot tone decoder, a modulation circuit, a set of pilot tone oscillators, and a set of integrated circuits. When a ringing signal in the service line enters the base unit while the stereo unit is playing a recording tape, the operation of the motor of the stereo unit stops and the listener is enabled to proceed with the telephone conversation. Upon completing the conversation or after the party at the end of the line has hung up, the stereo unit returns to its operating state and the user may resume listening to the recording tape.

MAY, RANDALL L.

ADJUSTABLE TRIPOD STAND

U.S. Pat. No. 5,072,910

An adjustable tripod stand having independently adjustable legs comprises a longitudinal extensible upright portion of telescoping tubular members, a plurality of collar members slideably mounted on the upright portion which are longitudinally adjustable relative to one another and to the upright portion for selective positioning thereon, and a plurality of movable legs members operatively connected to upper and lower collar members for selective independent longitudinal positioning and radial extension relative to the upright portion and to one another. When an upper leg supporting collar and the corresponding lower collar are moved toward each other on the upright portion, the bottom of the leg connected thereto will be extended radially outward independently of the other legs, and when the upper leg supporting collar and the corresponding lower collar are moved away from each other, the bottom of the leg connected thereto will be drawn radially inward independently of the other legs. The independent positioning of the legs may be at different distances from the upright portion or in different planes relative to the other legs and thus allows the stand to be erected in limited or confined areas or on multi-level surfaces. The independent positioning of the legs also allows the longitudinal axis of the stand to be tilted to an off-vertical axis position for positioning the center of gravity of the supported vehicle within the supporting legs.

SUMMARY OF THE INVENTION

A primary object of the present invention is to provide a media master apparatus that will overcome the shortcomings of the prior art devices.

Another object is to provide a media master apparatus that contains an adjustable stand supporting an electronics communication unit, which can be conveniently operated by a person using an exercise device adjacent the apparatus.

An additional object is to provide a media master apparatus, in which the electronics communication unit houses a TV receiver, CD player, tape player, AM-FM radio receiver and portable telephone, so that when a phone call comes in, an easy access mute button can be activated to turn the sound off of the TV receiver, CD player, tape player or Am-FM radio receiver, to allow the person exercising to answer the phone call.

A further object is to provide a media master apparatus that is simple and easy to use.

A still further object is to provide a media master apparatus that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
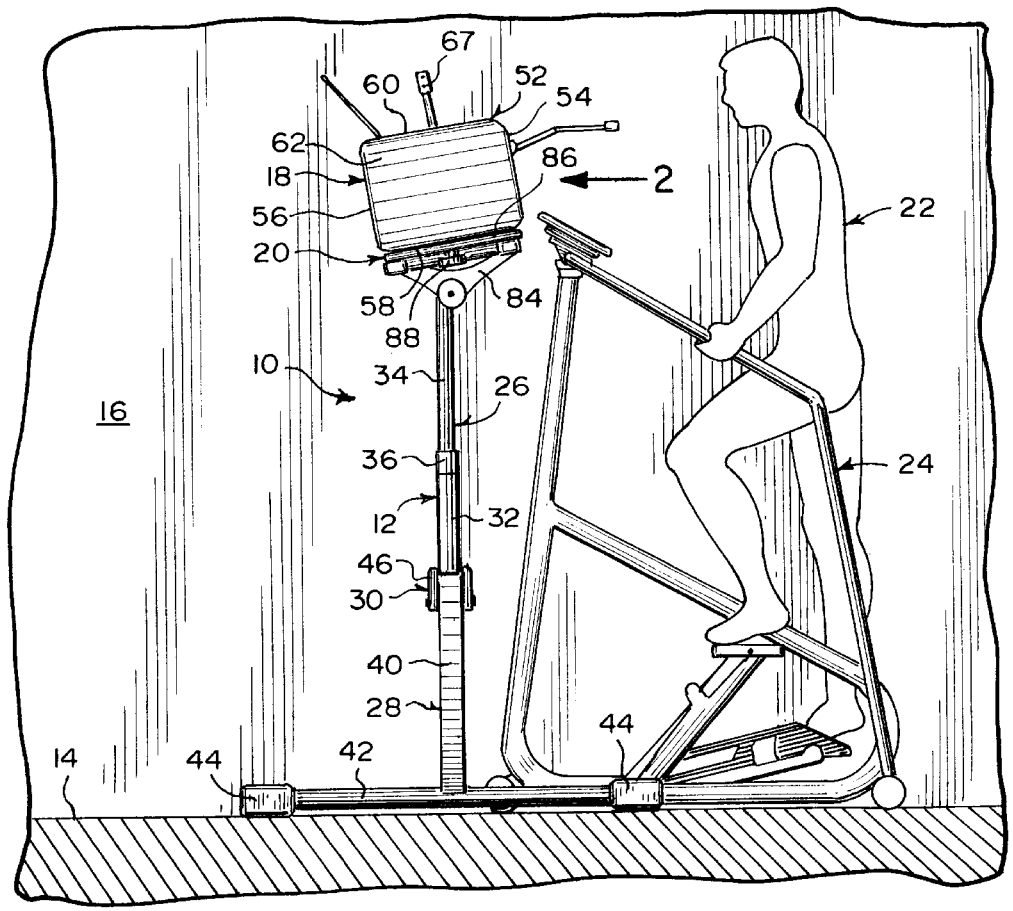
FIG. 1 is a left side elevational view of the instant invention being adjacent to a person using an exercise device.
Figure 1A:
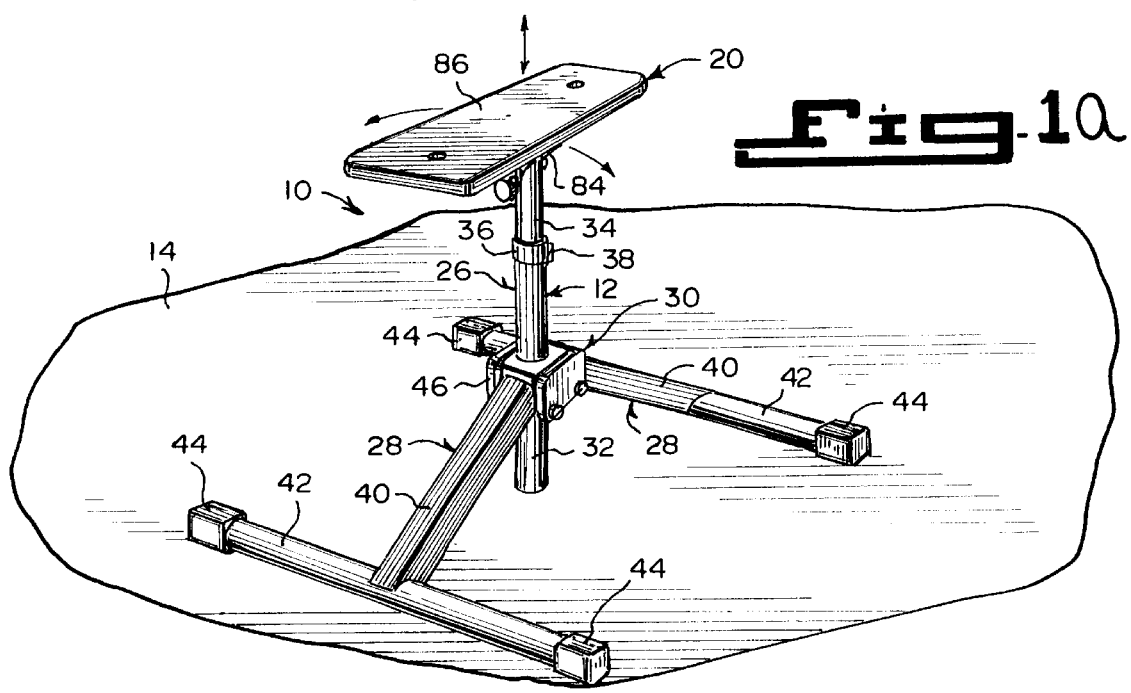
FIG. 1a is a rear perspective view of just the adjustable stand.
Figure 2:
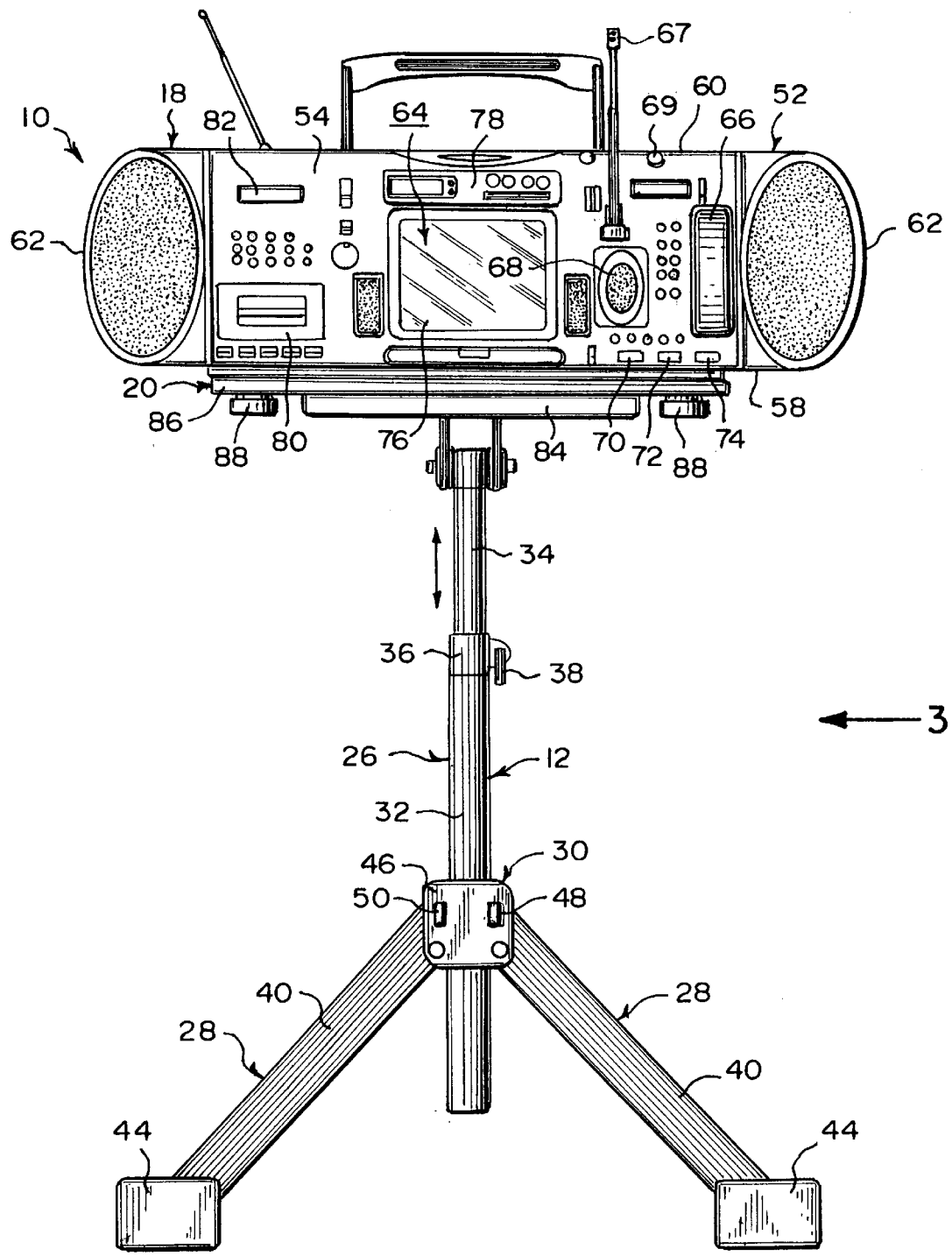
FIG. 2 is a front elevational view of the instant invention per se, taken in the direction of arrow 2 in FIG. 1.
Figure 3:
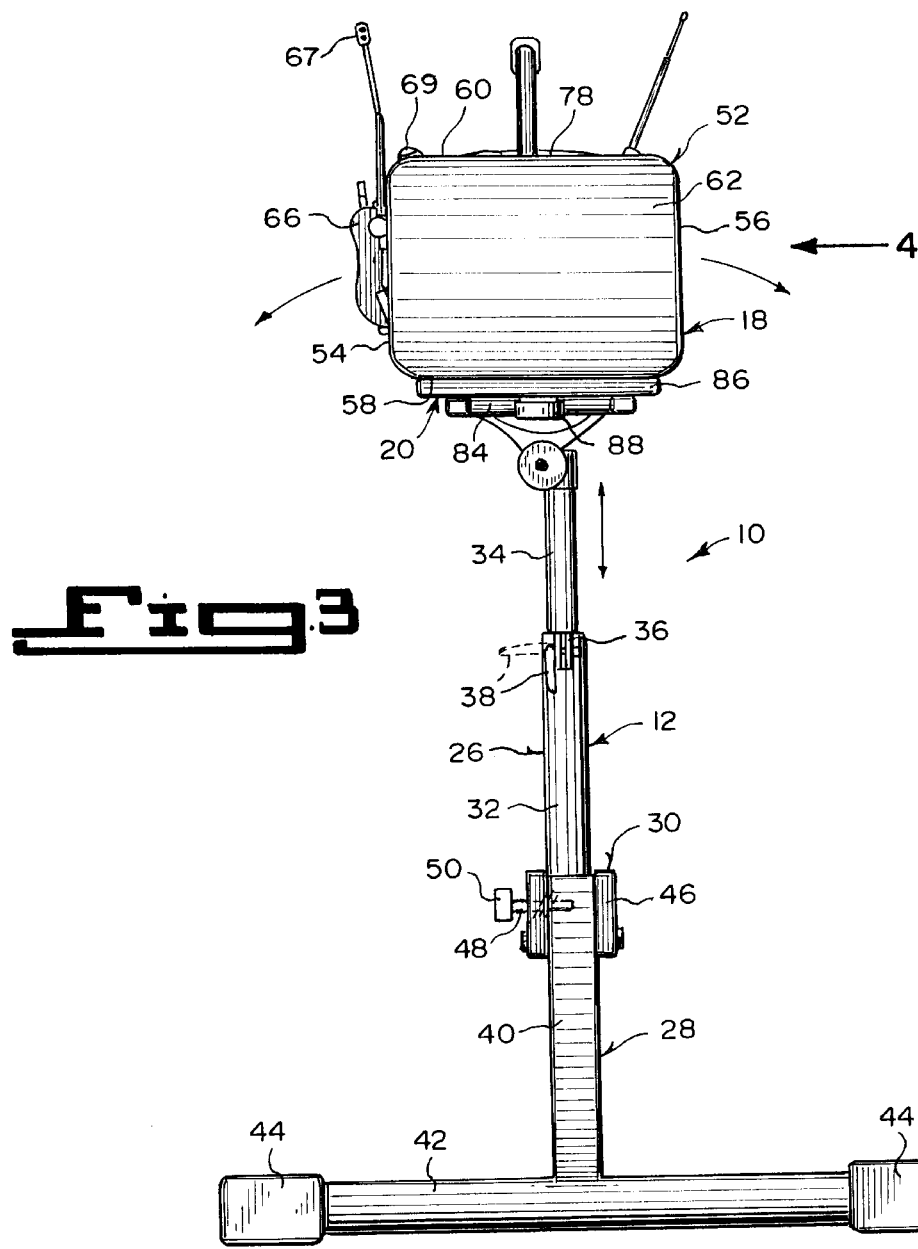
FIG. 3 is a right side elevational view, taken in the direction of arrow 3 in FIG. 2.
Figure 4:
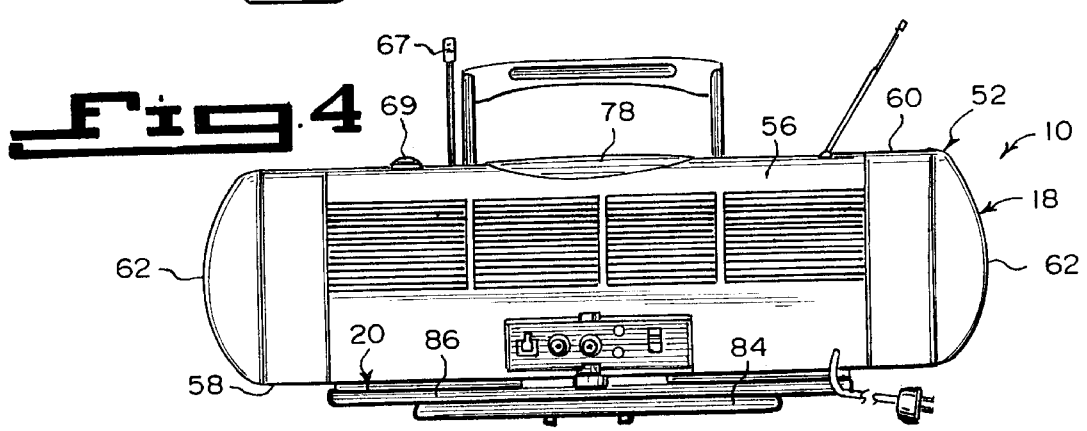
FIG. 4 is a rear elevational view taken in the direction of arrow 4 in FIG. 3, with the adjustable stand broken away.

Turning now descriptively to the drawings, in which similar reference characters denote similar elements throughout the several views, FIGS. 1 through 4 illustrate a media master apparatus 10 comprising an adjustable stand 12 placed upon a floor 14 in a building 16. An electronics communication unit 18 is provided. A facility 20 is for attaching the electronics communication unit 18 to a top end of the adjustable stand 12. A person 22 using an exercise device 24 on the floor 14 adjacent the apparatus 10, can conveniently operate the electronics communication unit 18 from the exercise device 24.

The adjustable stand 12 includes an upright portion 26 with a plurality of support members 28. An assemblage 30 is for connecting an upper end of each support member 28 to the upright portion 26, so as to maintain the upright portion 26 in a vertical position.

The upright portion 26 consists of an elongate bottom tube 32. An elongate extension tube 34 is received in the elongate bottom tube 32 in a sliding manner. A component 36 on the elongate bottom tube 32 is for securing the elongate extension tube 34 in the elongate bottom tube 32 in a selected position. The securing component 36 is a height adjustment key 38.

Each support member 28 contains a leg segment 40. A transverse foot 42 is affixed to a bottom end of the leg segment 40. A pair of shoes 44 are provided. Each shoe 44 is fitted on one end of the transverse foot 42 to rest upon the floor 14.

The connecting assemblage 30 comprises a bracket 46 near a bottom end of the upright portion 26. A plurality of spring biased pin lock assemblies 48 in the bracket 46 each have a finger grip pull tab 50, to retain the upper ends of the support members 28 thereto. The electronics communication unit 18 includes a rectangular cabinet 52, having a front wall 54, a rear wall 56, a bottom wall 58, a top wall 60 and a pair of end walls 62.

The rectangular cabinet 52 contains a plurality of electronic equipment 64 carried therein, a portable telephone 66 having an adjustable microphone 67 and a speaker phone 68, a telephone light indicator 69, a mute button 70, a phone call answering button 72 and an end phone call button 74. When an incoming phone call is received, the telephone light indicator 69 will light up to allow the person 22 to press the mute button 70 to turn the sound of the electronic equipment 64 off, press the phone call answering button 72 to receive the phone call, press the end phone call button 74 to terminate the phone call and finally repress the mute button 70 to turn the sound of the electronic equipment 64 back on. The electronic equipment 64 consists of a television receiver 76, a compact disc player 78, a tape player 80 and an AM-FM radio receiver 82.

The attaching facility 20 consists of a support frame 84 pivotally connected to the top end of the adjustable stand 12. A platform 86 is on the support frame 84. A pair of mounting thumbscrews 88 are provided. Each mounting thumbscrew 88 extends through the platform 86 and into the bottom of the electronics communication unit 18.

OPERATION OF THE INVENTION

To use the media master apparatus 10, the following steps should be taken:

1. Connect the upper ends of the support members 28 to the upright portion 26 via the connecting assemblage 30.
2. Place the support members 28 upon the floor 14 in the building 16 adjacent the exercise device 24, with the upright portion 26 in a vertical position.
3. Release the height adjustment key 38.
4. Raise or lower the elongate extension tube 34 in the elongate bottom tube 32 to its proper height.
5. Lock the height adjustment key 38.
6. Secure the bottom wall 58 of the rectangular cabinet 52 of the communication unit 18 to the platform 86 with the mounting thumbscrews 88.
7. Adjust the platform 86 via the support frame 84.
8. Press the mute button 70 to turn the sound of the electronic equipment off when an incoming phone call is received and the telephone light indicator 69 lights up.
9. Press the phone call answering button 72 to receive the phone call.
10. Press the end phone call button 74 to terminate the phone call.
11. Repress the mute button 70 to turn the sound of the electronic equipment 64 back on.

LIST OF REFERENCE NUMBERS 10 media master apparatus
12 adjustable stand of 10
14 floor in 16
16 building
18 electronics communication unit of 10
20 attaching facility of 10
22 person
24 exercise device
26 upright portion of 12
28 support member of 12
30 connecting assemblage of 12
32 elongate bottom tube of 26
34 elongate extension tube of 26
36 securing component of 26
38 height adjustment key for 36

40 leg segment of 28
42 transverse foot of 28
44 shoe of 28
46 bracket of 30
48 spring biased pin lock assembly of 30
50 finger grip pull tab on 48
52 rectangular cabinet of 18
54 front wall of 52
56 rear wall of 52
58 bottom wall of 52
60 top wall of 52
62 end wall of 52
64 electronic equipment in 52
66 portable telephone in 52
67 adjustable microphone of 66
68 speaker phone of 66
69 telephone light indicator in 52
70 mute button in 52
72 phone call answering button in 52
74 end phone call button in 52
76 television receiver of 64
78 compact disc player of 64
80 tape player of 64
82 AM-FM radio receiver of 64
84 support frame of 20
86 platform of 20
88 mounting thumbscrew of 20

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by letters patent is set forth in the appended claims:

1. A media master apparatus comprising:
   a) an adjustable stand adapted to be placed upon a floor in a building;
   b) an electronics communication unit comprising a rectangular cabinet having a front wall, a rear wall, a bottom wall, a top wall, and a pair of end walls;
   c) means for attaching said electronics communication unit to a top end of said adjustable stand, so that a person using an exercise device on the floor adjacent said apparatus can conveniently operate said electronics communication unit from the exercise device;
   d) said adjustable stand including an upright portion, plurality of support members, and means for connecting an upper end of each said support member to said upright portion to maintain said upright portion in a vertical position, said upright portion including an elongate bottom tube, an elongate extension tube received in said elongate bottom tube in a sliding manner, and means comprising a height adjustment key on said elongate bottom tube for securing said elongate extension tube in said elongate bottom tube in a selected position;
   e) each said support member including a leg segment, a transverse foot affixed to a bottom end of said leg segment, and a pair of shoes, in which each said shoe is fitted on one end of said transverse foot to rest upon the floor;
   f) said connecting means including a bracket near a bottom end of said upright portion and a plurality of spring biased pin lock assemblies in said bracket each having a finger grip pull tab to retain the upper ends of said support members thereto;
   g) said attaching means including a support frame pivotally connected to the top end of said adjustable stand, a platform on said support frame, and a pair of mounting thumbscrews extending through said platform and into the bottom of said electronics communication unit; and
   h) the rectangular cabinet of said electronics communication unit having a television receiver, a compact disc player, a tape player, an AM-FM radio receiver and a portable telephone with an adjustable microphone and a speaker phone, a telephone light indicator, a phone call answering button, an end phone call button, and a mute button to mute the sound of said television receiver, disc player, tape player, and radio receiver during a telephone call.

\* \* \* \* \*